(12) United States Patent
Ando et al.

(10) Patent No.: US 10,178,272 B2
(45) Date of Patent: Jan. 8, 2019

(54) IMAGE FORMING APPARATUS

(71) Applicant: KYOCERA Document Solutions Inc., Osaka (JP)

(72) Inventors: Yoshihiro Ando, Osaka (JP); Masuo Kawamoto, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/635,092

(22) Filed: Jun. 27, 2017

(65) Prior Publication Data

US 2018/0007231 A1 Jan. 4, 2018

(30) Foreign Application Priority Data

Jul. 1, 2016 (JP) ................. 2016-132098

(51) Int. Cl.
| | |
|---|---|
| *G06F 15/00* | (2006.01) |
| *H04N 1/333* | (2006.01) |
| *H04W 4/80* | (2018.01) |
| *H04N 1/00* | (2006.01) |
| *H04N 1/32* | (2006.01) |

(52) U.S. Cl.
CPC ..... *H04N 1/33384* (2013.01); *H04N 1/00037* (2013.01); *H04N 1/00307* (2013.01); *H04N 1/00925* (2013.01); *H04N 1/32122* (2013.01); *H04W 4/80* (2018.02); *H04N 2201/0094* (2013.01); *H04N 2201/3215* (2013.01)

(58) Field of Classification Search
CPC ........... H04N 1/33384; H04N 1/00037; H04N 2201/3215; H04N 1/32122; H04N 1/00307; H04N 2201/0094; H04N 1/00925; H04W 4/008

USPC ......................................... 358/1.14
See application file for complete search history.

(56) References Cited

U.S. PATENT DOCUMENTS

| | | | |
|---|---|---|---|
| 8,223,356 B2 * | 7/2012 | Kadowaki | G06Q 30/02 358/1.15 |
| 2015/0277806 A1 * | 10/2015 | Shibata | G06F 3/1203 358/1.14 |
| 2016/0179440 A1 * | 6/2016 | Saeda | G06F 3/1253 358/1.15 |

FOREIGN PATENT DOCUMENTS

| | | |
|---|---|---|
| JP | 2004-193923 | 7/2004 |
| JP | 2012-146291 | 8/2012 |

* cited by examiner

*Primary Examiner* — Saeid Ebrahimi Dehkordy

(57) ABSTRACT

In an image forming apparatus, a reservation managing unit receives a reservation request from a mobile terminal device of a user, and registers reservation information. The reservation information indicates (a) a usage time zone specified by the received reservation request and (b) the mobile terminal device. The operation restriction unit changes an operation control mode from an operation permission mode to an operation prohibition mode if (a) the mobile terminal device detected by a terminal detecting unit is a mobile terminal device of a reserving user who reserved as the usage time zone a current or a next time zone and (b) there are no currently using users. The operation permission mode is a status where an operation of an unspecified user can be received, and the operation prohibition mode is a status where a user operation is prohibited until a release operation of the reserving user.

5 Claims, 3 Drawing Sheets

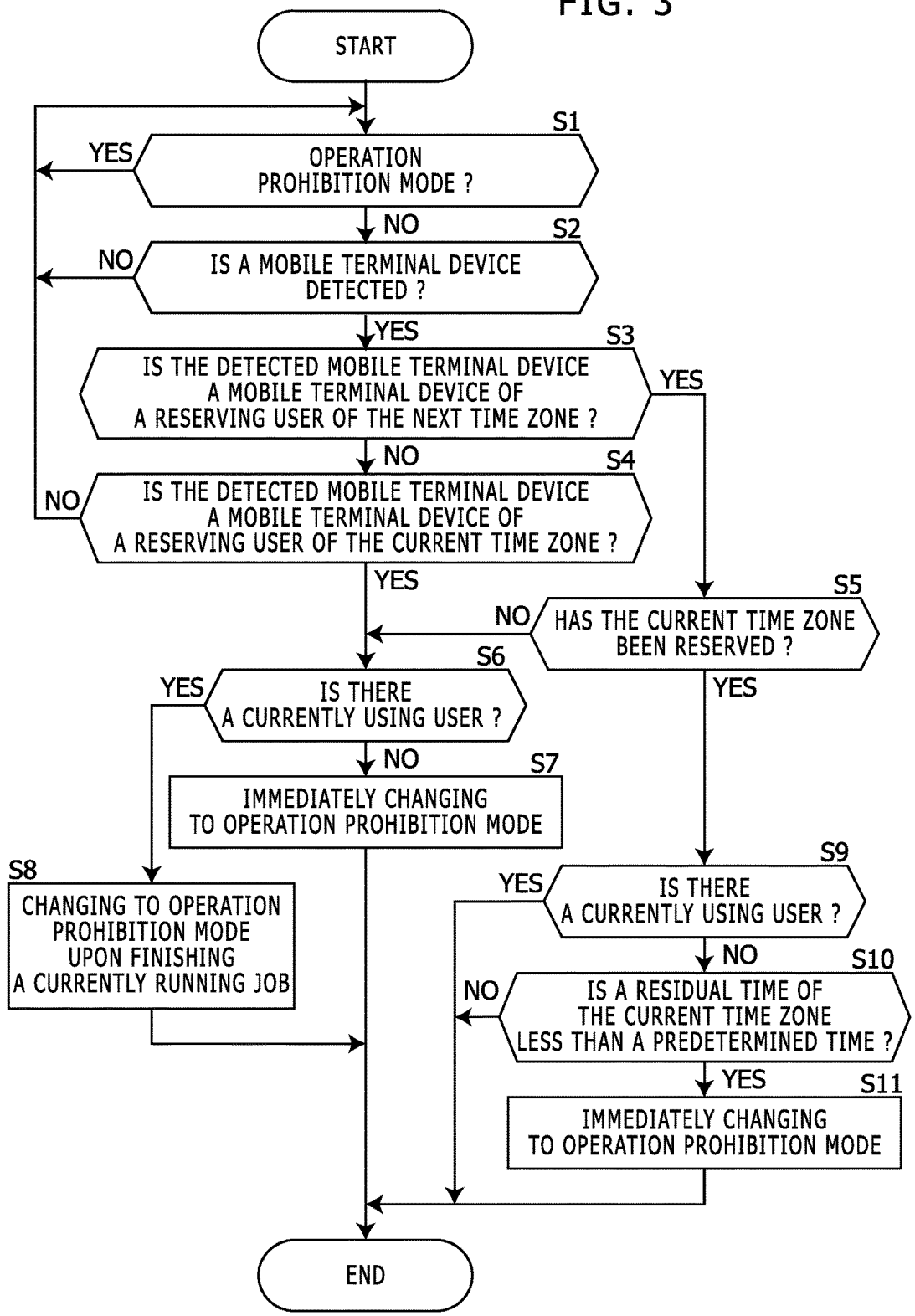

IMAGE FORMING APPARATUS

CROSS-REFERENCE TO RELATED APPLICATIONS

This application relates to and claims priority rights from Japanese Patent Application No. 2016-132098, filed on Jul. 1, 2016, the entire disclosures of which are hereby incorporated by reference herein.

BACKGROUND

1. Field of the Present Disclosure

The present disclosure relates to an image forming apparatus.

2. Description of the Related Art

A reservation apparatus receives from a client terminal an operation reservation instruction that includes a desired operation finishing time of a multi function peripheral, estimates an operation starting time on the basis of an operation time past record of a user, informs it to the client terminal, and keeps the multi function peripheral in an operation prohibition state from the operation starting time until receiving a release instruction.

Further, when receiving a usage reservation request, an image forming apparatus sets usage reservation, and changes to a usage prohibition status from a timing when the reserving person's usage turn comes until a release instruction is inputted.

However, in the aforementioned technique, when the reserved usage turn or the operation stating time point of an operation reservation comes, the image forming apparatus automatically changes to an operation prohibition status, and then until the reserving person releases this status, the image forming apparatus remains not in use.

For example, if the reserving person is not at a location of the image forming apparatus when the operation starting time point of the operation reservation comes, the image forming apparatus remains not in use until the reserving person comes to the location of the image forming apparatus, even if another user wants to use it.

In addition, if another user than the reserving person starts to use the image forming apparatus right before the operation stating time point of the operation reservation, this another user's usage is interrupted in a short time.

In such a case, this another user feels inconvenience.

Further, if another user than the reserving person starts to use the image forming apparatus right before the operation stating time point of the operation reservation, then after this another user's usage is interrupted and it takes some time to remove a document set on the image forming apparatus, and consequently, the reserving person may not start to use the image forming apparatus at the operation starting time of the operation reservation, even if the reserving person is at the location of the image forming apparatus.

In such a case, the reserving user feels inconvenience.

SUMMARY

An image forming apparatus according to an aspect of the present disclosure includes an input device, a near field wireless communication device, a terminal detecting unit, a reservation managing unit, and an operation restriction unit. The input device is configured to receive a user operation. The terminal detecting unit is configured to detect a mobile terminal device by using the near field wireless communication device. The reservation managing unit is configured to receive a reservation request from a mobile terminal device of a user, and register reservation information, the reservation information indicating (a) a usage time zone specified by the received reservation request and (b) the mobile terminal device, the reservation request specifying the usage time zone among continuous plural time zones. The operation restriction unit is configured to change an operation control mode from an operation permission mode to an operation prohibition mode if (a) the mobile terminal device detected by the terminal detecting unit is a mobile terminal device of a reserving user who reserved as the usage time zone a current time zone or a next time zone of the current time zone and (b) there are no currently using users. Further the operation permission mode is a status where an operation of an unspecified user can be received, and the operation prohibition mode is a status where a user operation is prohibited until a release operation of the reserving user.

These and other objects, features and advantages of the present disclosure will become more apparent upon reading of the following detailed description along with the accompanied drawings.

BRIEF DESCRIPTION OF THE DRAWINGS

FIG. 3 shows a flowchart that explains a behavior of the image forming apparatus 2 shown in FIGS. 1 and 2.

DETAILED DESCRIPTION

Hereinafter, an embodiment according to an aspect of the present disclosure will be explained with reference to drawings.

Figure 1:
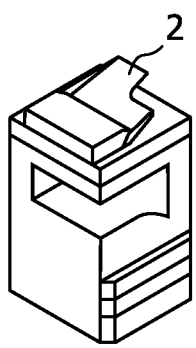
FIG. 1 shows a block diagram that indicates a configuration of an image forming system that includes an image forming apparatus according to an embodiment of the present disclosure.
Figure 1:
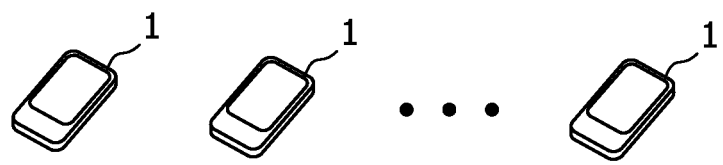
Figure 2:
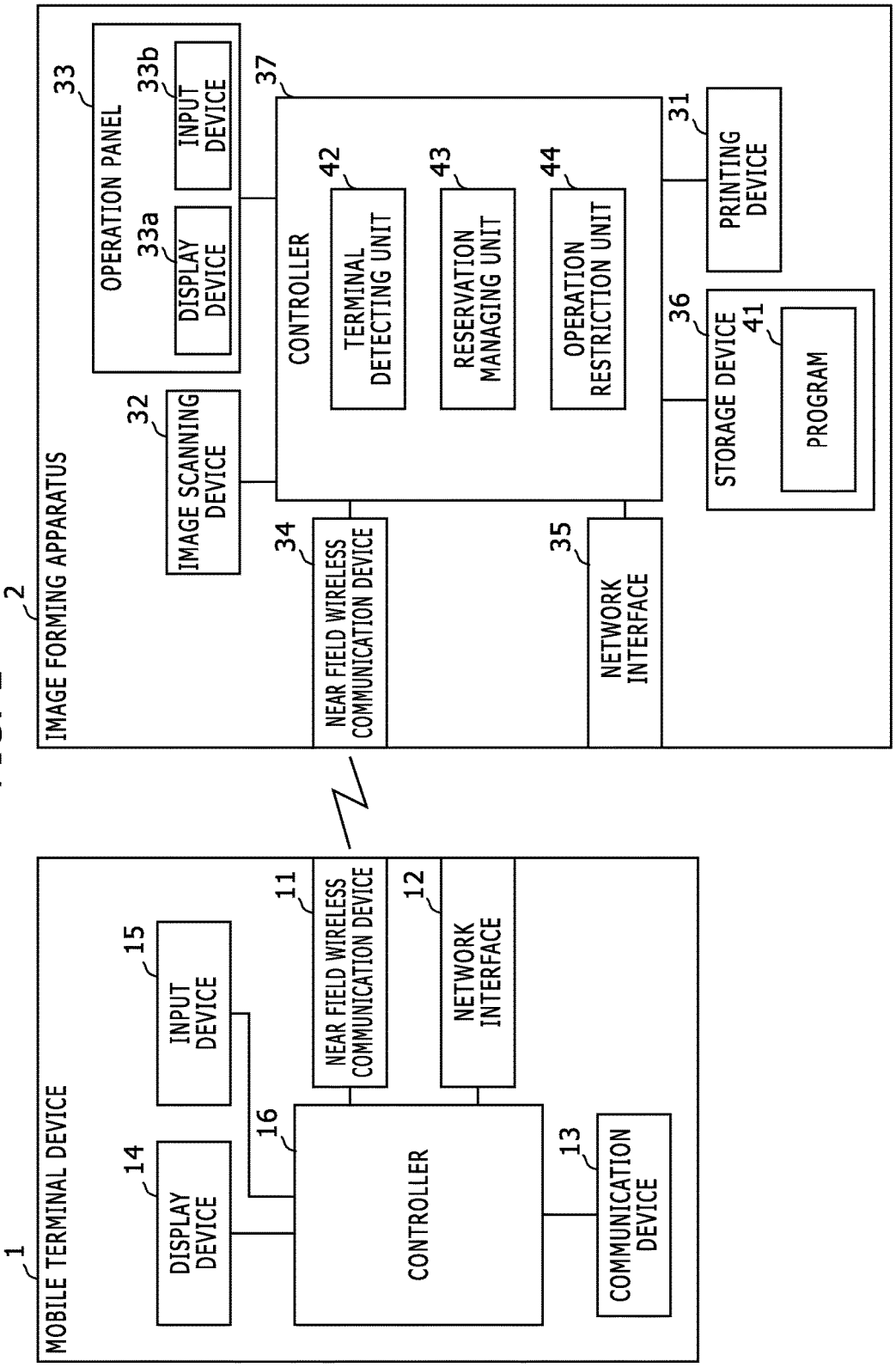
FIG. 2 shows a block diagram that indicates a configuration of a mobile terminal apparatus 1 and an image forming apparatus 2 shown in FIG. 1.

FIG. 1 shows a block diagram that indicates a configuration of an image forming system that includes an image forming apparatus according to an embodiment of the present disclosure. FIG. 2 shows a block diagram that indicates a configuration of a mobile terminal apparatus 1 and an image forming apparatus 2 shown in FIG. 1.

In the system shown in FIG. 1, unspecified plural users carry mobile terminal devices 1 such as smart phones, respectively, and an image forming apparatus 2 (e.g. a multi function peripheral, copier or the like) is installed at a location (e.g. convenience store or the like) where the image forming apparatus 2 is available to unspecified plural users.

The mobile terminal device 1 is for example a portable device such as a smart phone, and includes a near field wireless communication device 11, a network interface 12, a communication device 13 for a cellular phone network, a display device 14, an input device 15, a controller 16, and the like.

The near field wireless communication device 11 is an internal device that performs data communication according to a predetermined wireless communication standard such as Bluetooth (registered trademark).

The network interface 12 is a network interface of a wireless LAN (Local Area Network).

The communication device 13 is a communication device capable of accessing a cellular phone network using wireless communication.

The display device 14 is an internal device such as a liquid crystal display, that displays an operation screen and the like for a user. The input device 15 is an internal device such as a touch panel, that detects a user operation.

The controller 16 includes an ASIC (Application Specific Integrated Circuit) and/or a computer which includes a CPU (Central Processing Unit), a ROM (Read Only Memory), a RAM (Random Access Memory) and the like, and loads a control program to the RAM and executes it using the CPU and thereby acts.

The controller 16 controls internal devices in the mobile terminal device 1 and performs sorts of data processes.

Further, the controller 16 performs a reservation process and the like of the image forming apparatus 2. Specifically, in accordance with a user operation, the controller 16 transmits a reservation request that specifies a usage time zone to the image forming apparatus 2 directly or via an unshown server, through a network using the network interface 12 or the communication device 13.

On the other hand, in FIG. 2, the image forming apparatus 2 is a multi function peripheral available to plural users, and includes a printing device 31, an image scanning device 32, an operation panel 33, a near field wireless communication device 34, a network interface 35, a storage device 36, and a controller 37.

The printing device 31 is an internal device that performs printing an image on a printing paper sheet in an electrographic manner page by page on the basis of printing image data.

The image scanning device 32 is an internal device that optically scans a document image of a document and thereby generates image data of the document image.

The operation panel 33 is arranged on a surface of a housing of the image forming apparatus 2, and includes a display device 33a that displays sorts of messages to a user and an input device 33b that receives a user operation. For example, a liquid crystal display is used as the display device 33a. A key switch, a touch panel, an IC card reader or the like is used as the input device 33b.

The wireless communication device 34 is an internal device that performs data communication according to a predetermined near field wireless communication standard such as Bluetooth (registered trademark).

The communication device 35 is an electronic circuit connected to a network such as a wired LAN or a wireless LAN, and performs data communication with another apparatus (e.g. the terminal apparatus 1, an unshown server or the like) connected to the network.

Further, the storage device 36 is a nonvolatile storage device such as a flash memory or a hard disk. In the storage device 36, a program 41 and the like are stored.

Further, the controller 37 includes a computer, an ASIC (Application Specific Integrated Circuit) and/or the like, and controls internal devices in the image forming apparatus 2. The controller 37 executes the program 41 using the computer and thereby embodies a terminal detecting unit 42, a reservation managing unit 43, and an operation restriction unit 44.

The terminal detecting unit 42 detects the mobile terminal device 1 by using the near field wireless communication device 34. Specifically, when the mobile terminal device 1 comes into a communicable area of the near field wireless communication device 34, the terminal detecting unit 42 detects this mobile terminal device 1.

The reservation managing unit 43 receives a reservation request from the mobile terminal device 1 of a user, and registers reservation information. The reservation request specifies a usage time zone among continuous plural time zones. The reservation information indicates (a) the usage time zone specified by the received reservation request and (b) the mobile terminal device 1 (i.e. a unique identifier of the mobile terminal device 1). This unique identifier can be obtained from the mobile terminal device 1 using the near field wireless communication device 34 by the terminal detecting unit 42.

For example, 24 hours in a day is divided into continuous plural time zones (e.g. time zones of 30 minutes), and one of these plural time zone is specified as the aforementioned usage time zone in the reservation request.

The operation restriction unit 44 controls the operation panel 33 and thereby performs permission and prohibition of a user operation in accordance with an operation control mode. Specifically, the operation restriction unit 44 changes the operation control mode from an operation permission mode to an operation prohibition mode, if (a) the mobile terminal device 1 detected by the terminal detecting unit 42 is a mobile terminal device of a reserving user who reserved as the usage time zone a current time zone or a next time zone of the current time zone and (b) there are no currently using users (i.e. now no one uses the image forming apparatus 2). Here the operation permission mode is a status where an operation of an unspecified user can be received, and the operation prohibition mode is a status where a user operation is prohibited until a release operation of the reserving user. It should be noted that the mobile terminal devices 1 are identified with the aforementioned unique identifiers, respectively.

In this embodiment, if (a) the detected mobile terminal device is a mobile terminal device of a reserving user who reserved as the usage time zone the next time zone of the current time zone, (b) the current time zone is not reserved, and (c) there is a currently using user, then the operation restriction unit 44 changes the operation control mode from the operation permission mode to the operation prohibition mode upon finishing a running job of the currently using user.

In this embodiment, if (a) the detected mobile terminal device 1 is a mobile terminal device of a reserving user who reserved as the usage time zone the next time zone of the current time zone, (b) the current time zone is reserved, and (c) there are no currently using users, then the operation restriction unit 44 immediately changes the operation control mode from the operation permission mode to the operation prohibition mode if a residual time of the current time zone is less than a predetermined time (e.g. less than two minutes).

Further, in this embodiment, when registering the reservation information, the reservation managing unit 43 issues unique authentication information (e.g. a password, a token or the like) corresponding to the reservation information (i.e. the reserved usage time zone) for the mobile terminal device 1 of the reserving user. Furthermore, the aforementioned release operation is an input of this authentication information to the input device 33b. For example, if the authentication information is a text, this text is inputted using keys of the input device 33b. If the inputted authentication information is valid, the operation restriction unit 44 immediately changes the operation control mode from the operation prohibition mode to the operation permission mode.

The following part explains a behavior of the image forming apparatus 2. FIG. 3 shows a flowchart that explains a behavior of the image forming apparatus 2 shown in FIGS. 1 and 2.

If the current operation control mode is not the operation prohibition mode (in Step S1), the terminal detecting unit 42 watches whether at least one of the mobile terminal devices 1 comes into a communicable area of the near field wireless communication device 34 or not using the near field wireless communication device 34.

The initial value of the current operation control mode is set as the operation permission mode.

If the terminal detecting unit 42 detects the mobile terminal device 1, the terminal detecting unit 42 refers to reservation information in the aforementioned database, and thereby determines (a) whether the detected mobile terminal device 1 is the mobile terminal device 1 of a reserving user of a next time zone of a current time zone (in Step S3) and (b) whether the detected mobile terminal device 1 is the mobile terminal device 1 of a reserving user of the current time zone (in Step S4).

If (a) the detected mobile terminal device 1 is not the mobile terminal device 1 of the reserving user of the next time zone of the current time zone and (b) the detected mobile terminal device 1 is not the mobile terminal device 1 of the reserving user of the current time zone, then returning to Step S1, if the current operation control mode is not the operation prohibition mode (in Step S1), the terminal detecting unit 42 continues to watch whether at least one of the mobile terminal devices 1 comes into the communicable area (in Step S2).

Otherwise, if the detected mobile terminal device 1 is the mobile terminal device 1 of the reserving user of the next time zone of the current time zone, then the operation restriction unit 44 refers to reservation information in the aforementioned database and thereby determines whether the current time zone has been reserved by another user or not (in Step S5); and if the current time zone has not been reserved by another user, then the operation restriction unit 44 determines whether there is a user who currently uses the image forming apparatus 2 or not (in Step S6).

If in Step S6 it is determined that there are no users who currently use the image forming apparatus 2, then the operation restriction unit 44 immediately changes the operation control mode from the operation permission mode to the operation prohibition mode (in Step S7).

Contrarily, if in Step S6 it is determined that there is a user who currently uses the image forming apparatus 2, then the operation restriction unit 44 changes the operation control mode from the operation permission mode to the operation prohibition mode upon finishing a currently running job (i.e. print job, copy job or the like) (in Step S8).

Meanwhile, if in Step S5 it is determined that the current time zone has been reserved by another user, then the operation restriction unit 44 determines whether there is a user who currently uses the image forming apparatus 2 or not (in Step S9).

If in Step S6 it is determined that there is not a user who currently uses the image forming apparatus 2, then the operation restriction unit 44 determines whether if a residual time of the current time zone (i.e. a time until a starting time point of a next reserved time zone) is less than a predetermined time or not (in Step S10); and if the residual time of the current time zone is less than the predetermined time, then the operation restriction unit 44 immediately changes the operation control mode from the operation permission mode to the operation prohibition mode (in Step S11).

Thus, when the image forming apparatus 2 is not currently used even though the current time zone is reserved by another user, it is considered that usage of this another user has already been finished, and therefore the operation prohibition mode is set for a reserving user of the next time zone.

If in Step S4 it is determined that the detected mobile terminal device 1 is the mobile terminal device 1 of a reserving user of the current time zone, then the operation restriction unit 44 determines whether there is a user who currently uses the image forming apparatus 2 or not (in Step S6); and if there are no users who currently use the image forming apparatus 2, the operation restriction unit 44 immediately changes the operation control mode from the operation permission mode to the operation prohibition mode (in Step S7), and otherwise if there is a user who currently uses the image forming apparatus 2, the operation restriction unit 44 changes the operation control mode from the operation permission mode to the operation prohibition mode upon finishing a currently running job (in Step S8).

Thus, even in a reserved time zone, if a reserving user does not use the image forming apparatus 2, another user can use the image forming apparatus 2; and even if this another user uses the image forming apparatus 2, upon finishing a job, the operation prohibition mode is set in advance while a reserving user of the current time zone is on the way to a location of the image forming apparatus 2. Consequently, by the time a reserving user of the current time zone reaches a location of the image forming apparatus 2, a job of another user who used the apparatus 2 has been finished and the operation prohibition mode has been set, and therefore a reserving user of the current time zone is not prevented from using the image forming apparatus 2, and another user can use the image forming apparatus 2 in an unused time within the reserved time zone.

Further, when a reserving user of the next time zone comes to a location of the image forming apparatus 2, upon finishing a job, the operation prohibition mode is set in advance while the reserving user of the next time zone is on the way to a location of the image forming apparatus 2. Therefore, even though (in the operation permission mode) another user freely uses the image forming apparatus 2 if the image forming apparatus 2 is not in use, by the time a reserving user of the next time zone comes to a location of the image forming apparatus 2, the image forming apparatus 2 would finish a job of this another user and set the operation prohibition mode. Consequently, the reserving user of the next time zone is not prevented from using the image forming apparatus 2.

After changing to the operation prohibition mode, if the reserving user performs a release operation (e.g. inputting a password) to the input device 33b, then the operation prohibition mode is released and the operation permission mode is set, and thereby the image forming apparatus 2 can be operated using the input device 33b and the reserving user can use the image forming apparatus 2. In addition, upon setting the operation permission mode, the process shown in FIG. 3 is resumed.

As described, in the aforementioned embodiment, the terminal detecting unit 42 detects a mobile terminal device 1 by using the near field wireless communication device 34. The reservation managing unit 43 receives a reservation request from the mobile terminal device 1 of a user, and registers reservation information. The reservation information indicates (a) a usage time zone specified by the received reservation request and (b) the mobile terminal device 1. The reservation request specifies the usage time zone among continuous plural time zones. The operation restriction unit 44 changes the operation control mode from an operation permission mode to an operation prohibition mode, if (a) the mobile terminal device 1 detected by the terminal detecting unit 42 is a mobile terminal device of a reserving user who reserved as the usage time zone a current time zone or a next time zone of the current time zone and (b) there are no currently using users.

Consequently, when a reserving user reaches a location of the image forming apparatus 2, the reserving user immediately can start to use the image forming apparatus 2, and inconvenient situation of a user due to the reservation is reduced.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the mobile terminal device 1 may be configured so that the mobile terminal device 1 can browse via an unshown server or the like (a) whether the image forming apparatus 2 is currently used or not and (b) a reservation situation (i.e. whether there is reservation in each of time zones including a current time zone and later or not, whether a reserving user actually used it in a reserved time zone among time zones including a current time zone and before, and/or the like).

Further, in the aforementioned embodiment, the mobile terminal device 1 may (a) determine a distance between a fixed location of the image forming apparatus 2 and a current location of the mobile terminal device 1, (b) calculate a traveling time based on the distance, and (c) determines a usage time zone to be reserved on the basis of a current time point and the traveling time.

Furthermore, in the aforementioned embodiment, regardless of whether a mobile terminal device 1 is detected or not, the image forming apparatus 2 may automatically set the operation control mode to the operation prohibition mode within a predetermined time (e.g. any one of 1 minute to 5 minutes) from a starting time point of a reserved usage time zone, and if a release operation is not detected until the predetermined time elapses, the image forming apparatus 2 may automatically change the operation control mode to the operation permission mode.

Furthermore, in the aforementioned embodiment, the reservation managing unit 43 may cause the display device 33a to display a message to a user who starts usage in a previous time zone of the reserved usage time zone if the user who starts usage in the previous time zone is a user other than the reserving user of the reserved usage time zone. This message indicates that usage in a next time zone is reserved by another user. Consequently, a user who starts usage in the previous time zone knows that its next time zone has been reserved, and the user tries to finish the usage by the next time zone and therefore when the reserving user reaches a location of the image forming apparatus 2, the reserving user is readily enabled to immediately start the usage with no problems.

What is claimed is:

1. An image forming apparatus, comprising:
    a printer;
    an input device configured to receive a user operation from a user using a mobile terminal device; the user operation being an operation using said printer;
    a near field wireless communication device;
    a terminal detecting unit configured to detect the mobile terminal device by using the near field wireless communication device;
    a reservation managing unit configured to receive a reservation request from the mobile terminal device of the user, and register reservation information, the reservation information indicating (a) a usage time zone specified by the received reservation request and (b) the mobile terminal device, the reservation request specifying the usage time zone among continuous plural time zones; and
    an operation restriction unit configured to change an operation control mode from an operation permission mode to an operation prohibition mode if (a) the mobile terminal device detected by the terminal detecting unit is a mobile terminal device of a reserving user who reserved as the usage time zone a current time zone or a next time zone of the current time zone and (b) there are no currently using users;
    wherein the operation permission mode is a status where an operation of the printer by an unspecified user can be received, and the operation prohibition mode is a status where a user operation of the printer is prohibited until a release operation of the reserving user; wherein the user can access a remote server by using the mobile device to determine if the printer is currently being used and if there is an existing reservation for any of the continuous plural time zones.

2. The image forming apparatus according to claim 1, wherein the operation restriction unit changes the operation control mode from the operation permission mode to the operation prohibition mode upon finishing a running job of a currently using user, if (a) the detected mobile terminal device is a mobile terminal device of a reserving user who reserved as the usage time zone the next time zone, (b) the current time zone is not reserved, and (c) there is the currently using user.

3. The image forming apparatus according to claim 1, wherein the operation restriction unit immediately changes the operation control mode from the operation permission mode to the operation prohibition mode if a residual time of the current time zone is less than a predetermined time, if (a) the detected mobile terminal device is a mobile terminal device of a reserving user who reserved as the usage time zone the next time zone, (b) the current time zone is reserved, and (c) there are no currently using users.

4. The image forming apparatus according to claim 1, wherein
    the reservation managing unit issues unique identification information corresponding to the reservation information when registering the reservation information;
    the release operation is input of the authentication information to the input device; and
    the operation restriction unit immediately changes the operation control mode from the operation prohibition mode to the operation permission mode if the inputted authentication information is valid.

5. The image forming apparatus according to claim 1, further comprising a display device configured to a message to a user;
    wherein the reservation managing unit causes the display device to display a message to a user who starts usage in a previous time zone of the reserved usage time zone if the user who starts usage in the previous time zone is a user other than the reserving user of the reserved usage time zone, the message indicating that usage in a next time zone is reserved by another user.

* * * * *